(12) United States Patent
Nesvadba et al.

(10) Patent No.: US 8,492,511 B2
(45) Date of Patent: Jul. 23, 2013

(54) PROCESS FOR THE PREPARATION OF CROSSLINKED NITROXIDE POLYMERS

(75) Inventors: Peter Nesvadba, Marly (CH); Lucienne Bugnon, Pfeffingen (CH)

(73) Assignee: Piotrek Co., Ltd., Shiga (JP)

( * ) Notice: Subject to any disclaimer, the term of this patent is extended or adjusted under 35 U.S.C. 154(b) by 722 days.

(21) Appl. No.: 12/296,330

(22) PCT Filed: Mar. 28, 2007

(86) PCT No.: PCT/EP2007/052973
§ 371 (c)(1),
(2), (4) Date: Jun. 1, 2010

(87) PCT Pub. No.: WO2007/115939
PCT Pub. Date: Oct. 18, 2007

(65) Prior Publication Data
US 2010/0240858 A1    Sep. 23, 2010

(30) Foreign Application Priority Data

Apr. 7, 2006  (EP) .................................... 06112360

(51) Int. Cl.
*C08F 4/00*    (2006.01)

(52) U.S. Cl.
USPC .............................................. 528/423; 524/1

(58) Field of Classification Search
USPC ................................ 525/327; 528/423; 524/1
See application file for complete search history.

(56) References Cited

U.S. PATENT DOCUMENTS
2005/0250884 A1*   11/2005   Nesvadba ...................... 524/99

FOREIGN PATENT DOCUMENTS
| JP | 2001-083672 A | 3/2001 |
| WO | WO 2004/026915 A1 | 4/2004 |
| WO | WO 2005/116092 A1 | 12/2005 |

* cited by examiner

*Primary Examiner* — Kelechi Egwim
(74) *Attorney, Agent, or Firm* — Millen, White, Zelano & Branigan, P.C.

(57) ABSTRACT

The invention relates to a process for the preparation of crosslinked polymers bearing nitroxide groups, which are prepared by a method frequently called atom transfer radical addition polymerization (ATRA). A further aspect of the invention is the use of such polymeric crosslinked nitroxides as stabilizers for polymers against the detrimental influences of heat and UV light, as stabilizers against premature polymerization of vinyl aromatic monomers and as active electrode materials in secondary batteries.

15 Claims, No Drawings

PROCESS FOR THE PREPARATION OF CROSSLINKED NITROXIDE POLYMERS

The invention relates to a process for the preparation of crosslinked polymers bearing nitroxide groups, which are prepared by a method frequently called atom transfer radical addition (ATRA). A further aspect of the invention is the use of such polymeric crosslinked nitroxides as stabilizers for polymers against the detrimental influences of heat and UV light, as stabilizers against premature polymerization of vinyl aromatic monomers and as active electrode materials in secondary batteries.

A recent method for the preparation of monomeric alkoxyamines is based on "Atom Transfer Radical Addition" (ATRA) as described for example in Macromolecules 1996, 29, 7661 and in WO 00/61544. This method is based on the reaction of nitroxides with halogen or pseudo-halogen containing organic compounds in the presence of suitable metals or metal salts and optionally a complexing ligand.

WO 2004/026915 in general discloses also polymers, which have been prepared by ATRA polymerization.

Crosslinked and in many solvents insoluble polymers with pending nitroxide radicals are particularly useful as active electrode materials in secondary batteries.

The use of various radicals, such as, for example, nitroxide radicals as active component in electrode materials of secondary batteries has been disclosed in EP 1 128 453. Since low solubility or insolubility of the electrode material in the battery electrolyte is preferable, insoluble polymeric or oligomeric nitroxides are of particular interest.

Due to the fast growing market of electronic devices, such as mobile telephones and mobile personal computers (laptops), there have been increasing needs in the last years for small and large-capacity secondary batteries with high energy density.

Today the most frequently used secondary battery for such applications is the lithium-ion secondary battery. Such a lithium-ion secondary battery uses a transition-metal oxide containing lithium in the positive electrode (cathode) and carbon in a negative electrode (anode) as active materials, and performs charge and discharge via insertion of Li in and elimination of Li from these active materials.

However, since the lithium-ion secondary battery uses a transition-metal oxide with a large specific gravity, particularly in the positive electrode, it has an undesirable secondary battery capacity per unit weight. There have been, therefore, attempts for developing a large-capacity secondary battery using a lighter electrode material. For example, U.S. Pat. Nos. 4,833 and 2,715,778 have disclosed a secondary battery using an organic compound having a disulfide bond in a positive electrode, which utilizes, as a principle of a secondary battery, an electrochemical oxidation-reduction reaction associated with formation and dissociation of a disulfide bond.

As mentioned above EP 1 128 453 similarly discloses, for example, nitroxide radicals as active components in electrode materials of secondary batteries.

Surprisingly it has now been found that crosslinked polymeric radicals afford active electrode materials with high charge capacity.

One aspect of the invention is a process for the preparation of a crosslinked polymer with pending nitroxide groups comprising the following steps
reacting a bis nitroxide of formula (A) .ON-Ln-NO. (A) or a polynitroxide of formula (B) Ln-[NO.]$_n$ (B) with a bis-functional or polyfunctional organic halogen containing compound in the presence of a transition metal or transition metal salt in its lower oxidation state and optionally a ligand, capable of complexing the transition metal or transition metal salt;

wherein

Ln is an valent spacer group or a repeating unit connecting the nitroxide groups;

n is a number from 3 to 50 000 and wherein the molar ratio of the bis or polynitroxide compound of formula (A) or (B) to the bis-functional or polyfunctional halogen compound is equal or greater than 5:1.

The molar ratio of the bis or polynitroxide compound of formula (A) or (B) to the bis-functional or polyfunctional halogen compound is preferably greater 10:1, more preferably greater 50:1, in particular greater 100:1 and most preferably greater 500:1.

The spacer group Ln and the nitroxide radical may for example be of structure (F)

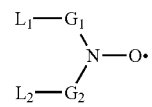

(F) wherein $G_1$ and $G_2$ independently represent a tertiary carbon atom to which unsubstituted $C_1$-$C_{18}$alkyl or phenyl; or $C_1$-$C_{18}$alkyl or phenyl substituted with CN, OH, COC$_1$-$C_{18}$alkyl, CO-phenyl, COOC$_1$-$C_{18}$alkyl, OC$_1$-$C_{18}$alkyl, NO$_2$, NHC$_1$-$C_{18}$alkyl or N(C$_1$-$C_{18}$)$_2$alkyl are bonded; or one of $G_1$ and $G_2$ is a secondary carbon atom to which a group —P(O)(OR$_{22}$)$_2$ is bonded and the other is as defined above; or $G_1$ and $G_2$ together with the nitrogen atom to which they are bonded form a 5 to 8 membered heterocyclic ring or a polycyclic or spirocyclic 5 to 20 membered heterocyclic ring system, which is substituted with 4 C$_1$-C$_4$alkyl groups or 2 C$_5$-C$_{12}$ spirocycloalkyl groups in ortho position to the nitrogen atom and which may be further substituted with one or more C$_1$-C$_{18}$alkyl, C$_1$-C$_{18}$alkoxy or =O groups; and which may be interrupted by a further oxygen or nitrogen atom;

$L_1$ and $L_2$ are linking groups which are for example R$_{101}$—Y or R$_{102}$—C(O)—Y— where Y is attached to G$_1$ and/or G$_2$; C$_1$-C$_{25}$alkylene, C$_2$-C$_{25}$alkylene interrupted by —O—, —S—, —SO—, —SO$_2$—,

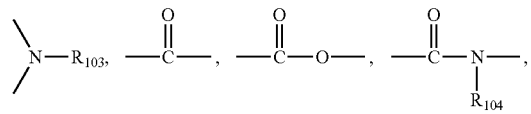

phenylene or C$_5$-C$_8$cycloalkylene; Y is O, or NR$_{109}$ wherein R$_{101}$ is C$_1$-C$_{18}$alkylene, R$_{102}$ is a direct bond or C$_1$-C$_{18}$alkylene, R$_{103}$ and R$_{104}$ are independently hydrogen or C$_1$-C$_{18}$alkyl and R$_{109}$ is hydrogen, C$_1$-C$_{18}$alkyl, C$_3$-C$_{18}$alkenyl, C$_3$-C$_{18}$alkinyl, phenyl, C$_7$-C$_9$phenylalkyl, which all may be unsubstituted or substituted by one or more hydroxy, halogen or C$_1$-C$_4$alkoxy groups.

Alkyl having up to 18 carbon atoms is a branched or unbranched radical, for example methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl or octadecyl.

$C_3$-$C_{18}$alkyl interrupted by oxygen or by

is, for example, $CH_3$—O—$CH_2CH_2$—, $CH_3$—S—$CH_2CH_2$—, $CH_3$—N($CH_3$)—$CH_2CH_2$—, $CH_3$—O—$CH_2CH_2$—O—$CH_2CH_2$—, $CH_3$—(O—$CH_2CH_2$—)$_2$O—$CH_2CH_2$—, $CH_3$—(O—$CH_2CH_2$—)$_3$O—$CH_2CH_2$— or $CH_3$—(O—$CH_2CH_2$—)$_4$O—$CH_2CH_2$—.

$C_7$-$C_9$-phenylalkyl is, for example, benzyl, α-methylbenzyl, α,α-dimethylbenzyl or 2-phenylethyl. Preference is given to benzyl and α,α-dimethylbenzyl.

$C_1$-$C_{25}$alkylene is a branched or unbranched radical, for example methylene, ethylene, propylene, trimethylene, tetramethylene, pentamethylene, hexamethylene, heptamethylene, octamethylene, decamethylene, dodecamethylene or octadecamethylene.

$C_2$-$C_{25}$alkylene interrupted by —O—, —S—, —SO—, —$SO_2$—,

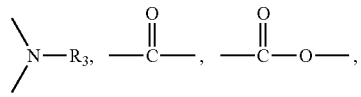

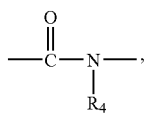

phenylene or $C_5$-$C_8$cycloalkylene.

Alkenyl having 3 to 18 carbon atoms is a branched or unbranched radical such as, for example, vinyl, propenyl, 2-butenyl, 3-butenyl, isobutenyl, n-2,4-pentadienyl, 3-methyl-2-butenyl, n-2-octenyl, n-2-dodecenyl, iso-dodecenyl, oleyl, n-2-octadecenyl or n-4-octadecenyl. Preference is given to alkenyl having 3 to 12, for example 3 to 6, especially 3 to 4 carbon atoms.

Alkinyl having from 3 to 18 carbon atoms is a branched or unbranched radical, for example propinyl, 2-butinyl, 3-butinyl, isobutinyl, n-2,4-pentadiinyl, 3-methyl-2-butinyl, n-2-octinyl, n-2-dodecinyl, isododecinyl.

Halogen is, for example, chlorine, bromine or iodine. Preference is given to chlorine and bromine.

Alkoxy having up to 18 carbon atoms is a branched or unbranched radical, for example methoxy, ethoxy, propoxy, isopropoxy, n-butoxy, isobutoxy, pentyloxy, isopentyloxy, hexyloxy, heptyloxy, octyloxy, decyloxy, tetradecyloxy, hexadecyloxy or octadecyloxy. Preference is given to alkoxy having from 1 to 12, especially from 1 to 8, e.g. from 1 to 6, carbon atoms.

Alkanoyloxy having up to 18 carbon atoms is a branched or unbranched radical, for example acetoxy, propionyloxy, butanoyloxy, pentanoyloxy, hexanoyloxy, heptanoyloxy, octanoyloxy, nonanoyloxy, decanoyloxy, undecanoyloxy, dodecanoyloxy, tridecanoyloxy, tetradecanoyloxy, pentadecanoyloxy, hexadecanoyloxy, heptadecanoyloxy, octadecanoyloxy, icosanoyloxy or docosanoyloxy. Preference is given to alkanoyloxy having from 2 to 12, e.g. from 2 to 6, carbon atoms.

Hydroxyl-substituted $C_2$-$C_{18}$alkyl is a branched or unbranched radical which contains preferably 1 to 3, in particular 1 or 2, hydroxyl groups, such as, for example, hydroxyethyl, 3-hydroxypropyl, 2-hydroxypropyl, 4-hydroxybutyl, 3-hydroxybutyl, 2-hydroxybutyl, 5-hydroxypentyl, 4-hydroxypentyl, 3-hydroxypentyl, 2-hydroxypentyl, 6-hydroxyhexyl, 5-hydroxyhexyl, 4-hydroxyhexyl, 3-hydroxyhexyl, 2-hydroxyhexyl, 7-hydroxyheptyl, 6-hydroxyheptyl, 5-hydroxyheptyl, 4-hydroxyheptyl, 3-hydroxyheptyl, 2-hydroxyheptyl, 8-hydroxyoctyl, 7-hydroxyoctyl, 6-hydroxyoctyl, 5-hydroxyoctyl, 4-hydroxyoctyl, 3-hydroxyoctyl, 2-hydroxyoctyl, 9-hydroxynonyl, 10-hydroxydecyl, 11-hydroxyundecyl, 12-hydroxydodecyl, 13-hydroxytridecyl, 14-hydroxytetradecyl, 15-hydroxypentadecyl, 16-hydroxyhexadecyl, 17-hydroxyheptadecyl, 18-hydroxyoctadecyl.

$C_5$-$C_{12}$cycloalkyl is for example cyclopentyl, cyclohexyl, cycloheptyl, methylcyclopentyl or cyclooctyl.

Aryl is phenyl, naphthyl or biphenyl, preferably phenyl.

The above nitroxides can be prepared in analogy to known methods or they are partially items of commerce.

The preparation of open chain nitroxides and alkoxyamines is for example described in WO 99/03894 or in WO 00/07981. Nitroxides and Alkoxyamines based on tetraalkyl piperidine are for example described in GB 2 335 1290 or in GB 2 361 235. Further heterocyclic alkoxyamines are described in GB 2 342 649.

For example the ligand is of formula I

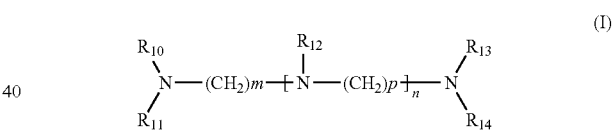

wherein $R_{10}$, $R_{11}$, $R_{13}$ and $R_{14}$ are independently H, $C_1$-$C_{12}$alkyl, $C_5$-$C_{12}$cycloalkyl or aryl;

$R_{12}$ is H, $C_1$-$C_{12}$alkyl, $C_5$-$C_{12}$cycloalkyl or aryl or a group —($CH_2$)q-$NR_{10}R_{11}$;

m, p and q are numbers from 1-4;

n is a number from 0 to 4; or the ligand is a bicyclic or polycyclic heteroaliphatic ring.

Individual ligands are, for example, selected from the group consisting of tris[2-(dimethylamino)ethyl]amine, N,N,N',N',N'-pentamethyldiethylenetriamine, N,N,N',N'-tetramethylethylenediamine, 1,1,4,7,10,10-hexamethyltriethylenetetramine, 1,4,7-trimethyl-1,4,7-triazacyclononane, 1,5,9-trimethyl-1,5,9-triazacyclododecane, 1,4,8,11-etramethyl-1,4,8,11-tetraaza-cyclotetradecane, 2,2'-bipyridyl, 2,2'-bi(4-t-butyl)pyridyl and 2,2',2'-terpyridyl.

The transition metal must have the possibility to exist in at least two oxidation states.

The transition metal is preferably selected from the group consisting of Cu, Fe, Mn, Mo, Cr, Ni and Ru and the transition metal salt in its lower oxidation state is a halogenide, sulfate, nitrate, carboxylate or trifluoromethane sulfonate of these metals.

It is also possible to use a mixture of transition metals or transition metal salts or a mixture of metals and salts.

Preferably the molar ratio between the transition metal or transition metal salt in its lower oxidation state and the halogen containing compound is from 1:1 to 3:1.

For example the molar ratio between the transition metal or transition metal salt in its lower oxidation state and the ligand is from 2:1 to 1:5, in particular from 1:1 to 1:3.

The process is, for example, carried out at a temperature from −20° C. to 100° C., preferably from 0° C. to 40° C.

Typically the process is carried out at normal pressure. The reaction time can vary in a wide range, for example, from 30 minutes to 24 hours.

For instance the bis-functional or polyfunctional halogen compound is of formula (IIa) or (IIb)

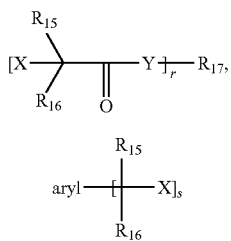

wherein
$R_{15}$, and $R_{16}$ are H, $C_1$-$C_{12}$alkyl, $C_6$-$C_{10}$aryl, $C_5$-$C_{12}$cycloalkyl;
aryl is phenyl, naphthyl or biphenyl;
Y is O or $NR_{15}$;
$R_{17}$ is a 2-10 valent organic or inorganic residue
r is a number from 2 to 10
s is a number from 2 to 6 and
X is Cl or Br.

Suitable individual compounds are, for example the following:
Bromo-acetic acid 2-(2-bromo-acetoxy)-ethyl ester,
2-Bromo-propionic acid 2-(2-bromo-propionyloxy)-ethyl ester,
Bromo-acetic acid 3-(2-bromo-acetoxy)-propyl ester,
2-Bromo-propionic acid 3-(2-bromo-propionyloxy)-propyl ester,
Bromo-acetic acid 4-(2-bromo-acetoxy)-butyl ester,
2-Bromo-propionic acid 4-(2-bromo-propionyloxy)-butyl ester,
Bromo-acetic acid 5-(2-bromo-acetoxy)-pentyl ester,
2-Bromo-propionic acid 5-(2-bromo-propionyloxy)-pentyl ester,
Bromo-acetic acid 6-(2-bromo-acetoxy)-hexyl ester,
2-Bromo-propionic acid 6-(2-bromo-propionyloxy)-hexyl ester,
Bromo-acetic acid 12-(2-bromo-acetoxy)-dodecyl ester,
2-Bromo-propionic acid 12-(2-bromo-propionyloxy)-dodecyl ester,
Chloro-acetic acid 2-(2-chloro-acetoxy)-ethyl ester,
2-Chloro-propionic acid 2-(2-chloro-propionyloxy)-ethyl ester,
Chloro-acetic acid 3-(2-chloro-acetoxy)-propyl ester,
2-Chloro-propionic acid 3-(2-chloro-propionyloxy)-propyl ester,
Chloro-acetic acid 4-(2-chloro-acetoxy)-butyl ester,
2-Chloro-propionic acid 4-(2-chloro-propionyloxy)-butyl ester,
Chloro-acetic acid 5-(2-chloro-acetoxy)-pentyl ester,
2-Chloro-propionic acid 5-(2-chloro-propionyloxy)-pentyl ester,
Chloro-acetic acid 6-(2-chloro-acetoxy)-hexyl ester,
2-Chloro-propionic acid 6-(2-chloro-propionyloxy)-hexyl ester,
Chloro-acetic acid 12-(2-chloro-acetoxy)-dodecyl ester,
2-Chloro-propionic acid 12-(2-chloro-propionyloxy)-dodecyl ester,
Bromo-acetic acid 2,3-bis-(2-bromo-acetoxy)-propyl ester,
2-Bromo-propionic acid 2,3-bis-(2-bromo-propionyloxy)-propyl ester,
Bromo-acetic acid 2,3,4-tris-(2-bromo-acetoxy)-butyl ester,
2-Bromo-propionic acid 2,3,4-tris-(2-bromo-propionyloxy)-butyl ester,
Bromo-acetic acid 2,3,4,5-tetrakis-(2-bromo-acetoxy)-pentyl ester,
2-Bromo-propionic acid 2,3,4,5-tetrakis-(2-bromo-propionyloxy)-pentyl ester,
Bromo-acetic acid 2,3,4,5,6-pentakis-(2-bromo-acetoxy)-hexyl ester,
2-Bromo-propionic acid 2,3,4,5,6-pentakis-(2-bromo-propionyloxy)-hexyl ester,
Chloro-acetic acid 2,3-bis-(2-chloro-acetoxy)-propyl ester,
2-Chloro-propionic acid 2,3-bis-(2-chloro-propionyloxy)-propyl ester,
Chloro-acetic acid 2,3,4-tris-(2-chloro-acetoxy)-butyl ester,
2-Chloro-propionic acid 2,3,4-tris-(2-chloro-propionyloxy)-butyl ester,
Chloro-acetic acid 2,3,4,5-tetrakis-(2-chloro-acetoxy)-pentyl ester,
2-Chloro-propionic acid 2,3,4,5-tetrakis-(2-chloro-propionyloxy)-pentyl ester,
Chloro-acetic acid 2,3,4,5,6-pentakis-(2-chloro-acetoxy)-hexyl ester,
2-Chloro-propionic acid 2,3,4,5,6-pentakis-(2-chloro-propionyloxy)-hexyl ester,
Bromo-acetic acid 3-(2-bromo-acetoxy)-2,2-bis-(2-bromo-acetoxymethyl)-propyl ester,
2-Bromo-propionic acid 3-(2-bromo-propionyloxy)-2,2-bis-(2-bromo-propionyloxymethyl)-propyl ester,
Chloro-acetic acid 3-(2-chloro-acetoxy)-2,2-bis-(2-chloro-acetoxymethyl)-propyl ester, 2-Chloro-propionic acid 3-(2-chloro-propionyloxy)-2,2-bis-(2-chloro-propionyloxymethyl)-propyl ester,
1,2-Bis-bromomethyl-benzene,
1,3-Bis-bromomethyl-benzene,
1,4-Bis-bromomethyl-benzene,
1,3,5-Tris-bromomethyl-benzene,
1,2,3,4,5,6-Hexakis-bromomethyl-benzene,
2-Bromo-N-[4-(2-bromo-propionylamino)-phenyl]-propionamide,
2-Bromo-propionic acid 4-(2-bromo-propionyloxy)-phenyl ester,
2-Bromo-N-[2-(2-bromo-propionylamino)-ethyl]-propionamide,
2-Bromo-propionic acid 2-(2-bromo-propionylamino)-ethyl ester,
2-Bromo-N-[6-(2-bromo-propionylamino)-hexyl]-propionamide,
1,2-Bis-chloromethyl-benzene,
1,3-Bis-chloromethyl-benzene,
1,4-Bis-chloromethyl-benzene,
1,3,5-Tris-chloromethyl-benzene,
1,2,3,4,5,6-Hexakis-chloromethyl-benzene,
2-Chloro-N-[4-(2-chloro-propionylamino)-phenyl]propionamide,
2-Chloro-propionic acid 4-(2-chloro-propionyloxy)-phenyl ester,
2-Chloro-N-[2-(2-chloro-propionylamino)-ethyl]-propionamide, 2-Chloro-propionic acid 2-(2-chloro-propionylamino)-ethyl ester and 2-Chloro-N-[6-(2-chloro-propionylamino)-hexyl]-propionamide.

Examples for the substituents have already been given. The compounds are mostly commercial or can be prepared by standard methods.

For example, the nitroxide group attached to the spacer group or repeating unit is of formulae (Ia)
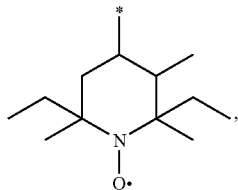

(Ib)
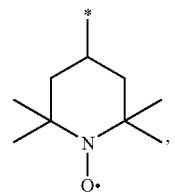

(Ic)
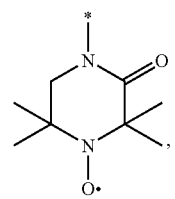

(Id)
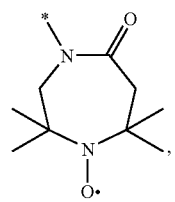

(Ie)
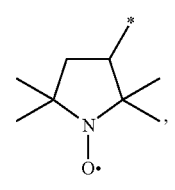

(If)
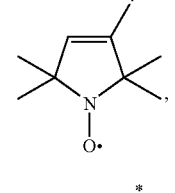

(Ig)
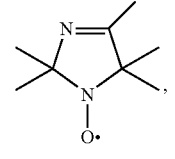

(Ih)
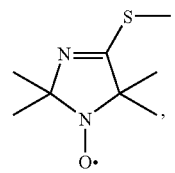

(Ii)
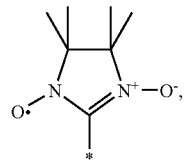

(Ij)
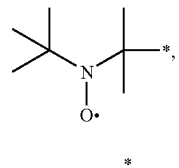

(Ik)
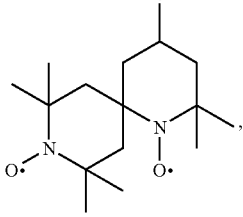

(Im)
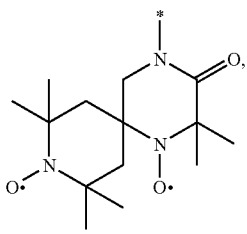

(In)
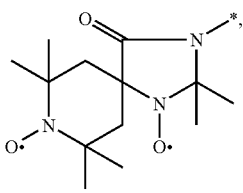

(Io)
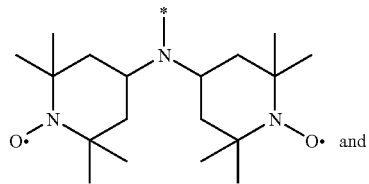

and (Ip)
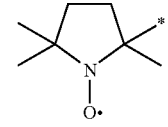

wherein * denotes the point of attachment.

Preferably the nitroxide group attached to the spacer group or repeating unit is of formulae

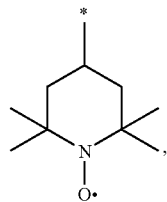
(Ib)

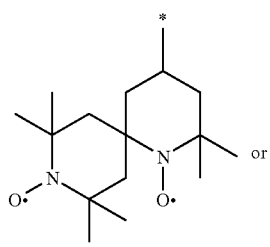
(Ik)

or (Io)

For instance the spacer group or repeating unit (Ln) is the residue of a divalent, trivalent or tetravalent acyl residue derived from the corresponding carboxylic acid, the residue of a divalent, trivalent or tetravalent alcohol derived from the corresponding alcohol or the residue of a divalent, trivalent or tetravalent amine derived from the corresponding amine or as repeating unit the residue of an ethylenically unsaturated carboxylic acid or carboxylic acid derivative.

In a preferred embodiment of the invention the polynitroxide of formula (B) has a repeating unit and is of formula (III)

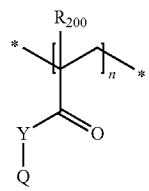
(III)

wherein $R_{200}$ is H or $C_1$-$C_4$alkyl

Y is O or $NR_{201}$ wherein $R_{201}$ is H or $C_1$-$C_{18}$alky;

Q is a nitroxide radical selected from the group of formulae (Ia) to (Ip) and n is a number from 10 to 50 000.

Examples for trivalent or tetravalent acyl residues are derived from the corresponding carboxylic acids, such as citric acid, trimellitic acid, trimesinic acid, pyromelitic acid or butane tetracarboxylic acid.

Examples for trivalent or tetravalent alcohols are glycerine, tris(hydroxymethyl)-propane, pentaerythritol, erythritol or tris(hydroxymethyl)-aminomethane. The corresponding amines can be derived in analogy.

The polymerization/crosslinking can be carried out in many solvents, preferred are aliphatic or aromatic hydrocarbons or ethers, for example tetrahydrofurane (THF), dibutyl ether or methyl-t-butyl ether.

The polymeric nitroxide can be isolated by standard procedures, such as for example by precipitation in a suitable solvent. Suitable solvents are for example saturated hydrocarbons.

Another aspect of the invention is a crosslinked polymer obtainable according to the process as described above.

Further aspects of the invention are the use of a crosslinked polymer obtainable according to the above process as stabilizer for polymers against the detrimental influences of heat and UV light or as stabilizer against premature polymerization of vinyl aromatic monomers and the use of a crosslinked polymer obtainable according to the process as described above as active electrode material in secondary batteries.

The following examples illustrate the invention.

EXAMPLE 1

Crosslinking of Poly-(2-methyl-acrylic acid 2,2,6,6-tetramethyl-piperidin-N-oxyl-4-yl ester)

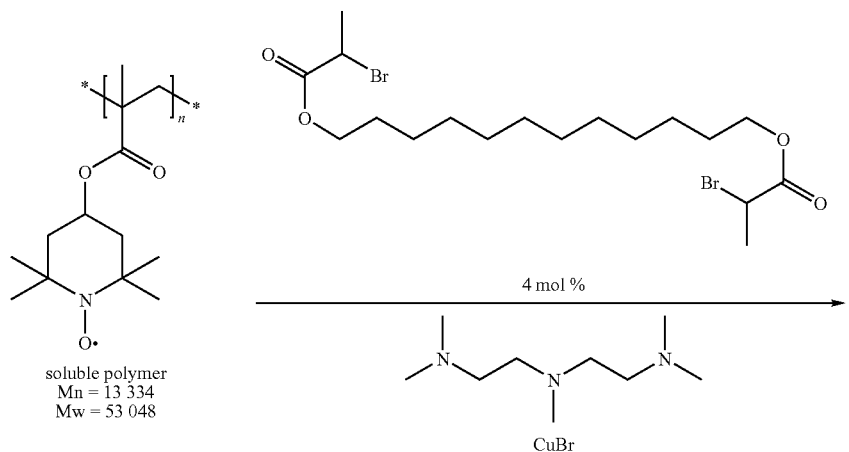

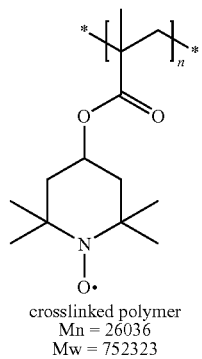

To a stirred solution of 2.40 g (10 mmol) of poly-(2-methyl-acrylic acid 2, 2, 6, 6-tetramethyl-piperidin-N-oxyl-4-yl) ester (Mn=13 334, Mw=53048, prepared as described in European Patent Application No. 05104974.9-2109) in 25 ml THF, are added under argon 0.188 g (0.4 mmol) of 2-bromopropionic acid 12-(2-bromo-propionyloxy)-dodecyl ester (prepared by reaction of 1,12-dodecandiol with 2-bromopropionyl bromide), 0.228 g (1.6 mmol) CuBr and 0.278 g (1.6 mmol) N,N,N',N',N'-pentamethyldiethylentriamine. The mixture is stirred at room temperature for 20 h and then poured into 400 ml water. The precipitate is filtered off, washed with water and dried to afford 2.49 g of a red powder, soluble in THF. GPC analysis shows Mn=26036, Mw=752323.

EXAMPLE 2

Crosslinking of Poly-(2-methyl-acrylic acid 2,2,6,6-tetramethyl-piperidin-N-oxyl-4-yl ester)

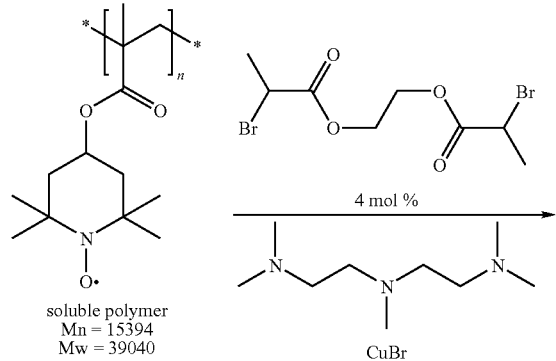

EXAMPLE 3

Crosslinking of Poly-(2-methyl-acrylic acid 2, 2, 6, 6-tetramethyl-piperidin-N-oxyl-4-yl ester)

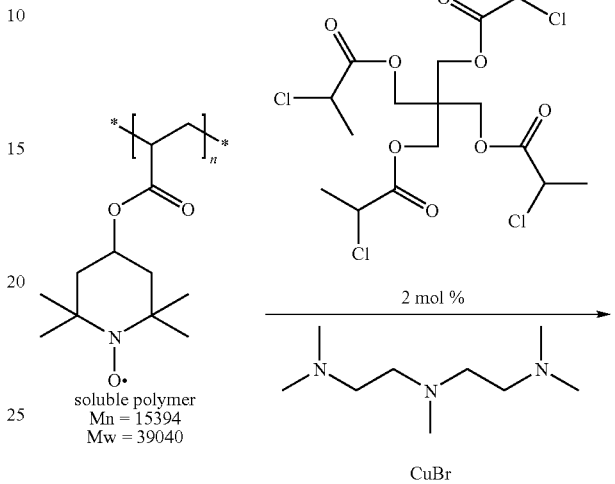

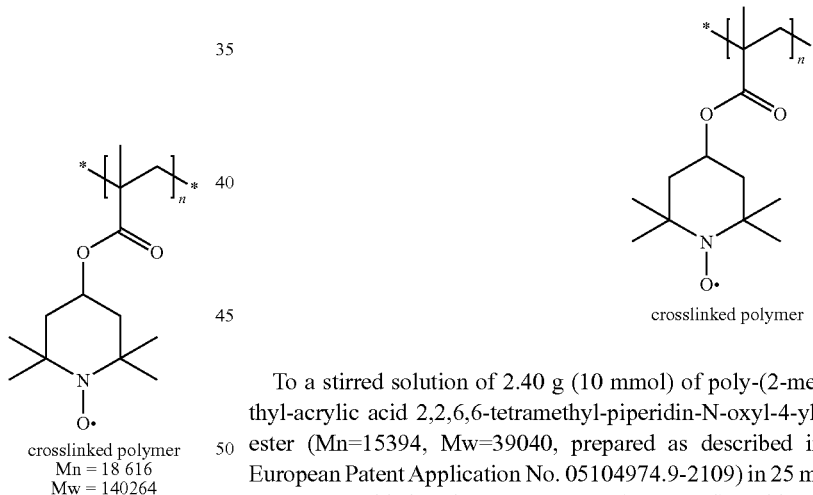

To a stirred solution of 1.20 g (5 mmol) of poly-(2-methyl-acrylic acid 2,2,6,6-tetramethyl-piperidin-N-oxyl-4-yl) ester (Mn=15394, Mw=33040, prepared as described in European Patent Application No. 05104974.9-2109) in 15 ml acetone are added under argon 0.061 g (0.2 mmol) of 2-bromo-propionic acid 2-(2-bromo-propionyloxy)-ethyl ester (prepared as described in Synth. Commun. 721 (2002)), 0.23 g (1.6 mmol) CuBr and 0.33 g (1.9 mmol) N,N,N',N',N'-pentamethyldiethylentriamine. The mixture is stirred at room temperature for 168 h and then poured into 40 ml water. The precipitate is filtered off, washed with water and dried to afford 0.99 g of a red powder. GPC analysis shows Mn=18616, Mw=14264.

To a stirred solution of 2.40 g (10 mmol) of poly-(2-methyl-acrylic acid 2,2,6,6-tetramethyl-piperidin-N-oxyl-4-yl) ester (Mn=15394, Mw=39040, prepared as described in European Patent Application No. 05104974.9-2109) in 25 ml aceton are added under argon 0.10 g (0.2 mmol) 2-chloropropionic acid 3-(2-chloro-propionyloxy)-2,2-bis-(2-chloro-propionyloxymethyl)-propyl ester (prepared by reaction of pentaerythrititol with 2-chloropropionyl chloride), 0.43 g (3 mmol) CuBr, and 0.52 g (3 mmol) N,N,N',N',N'-pentamethyldiethylentriamine. The mixture is stirred at room temperature. The originally fluid mixture transforms into a thick, deep green, gummy mass. Water (100 ml) is then added and the mixture is vigorously stirred for 3 h. The precipitate is filtered off, washed with water and dried. The red powder residue (2.44 g) is twice slurried up in 100 ml acetone and centrifuged. Drying of the acetone insoluble material affords 1.90 g of an orange powder. This material is completely insoluble in tetrahydrofurane, dichloromethane, toluene and acetone.

EXAMPLE 4

Crosslinking of Poly-(N,N-Bis-(2,2,6,6-tetramethyl-piperidin-N-oxyl-4-yl)-acrylamide)

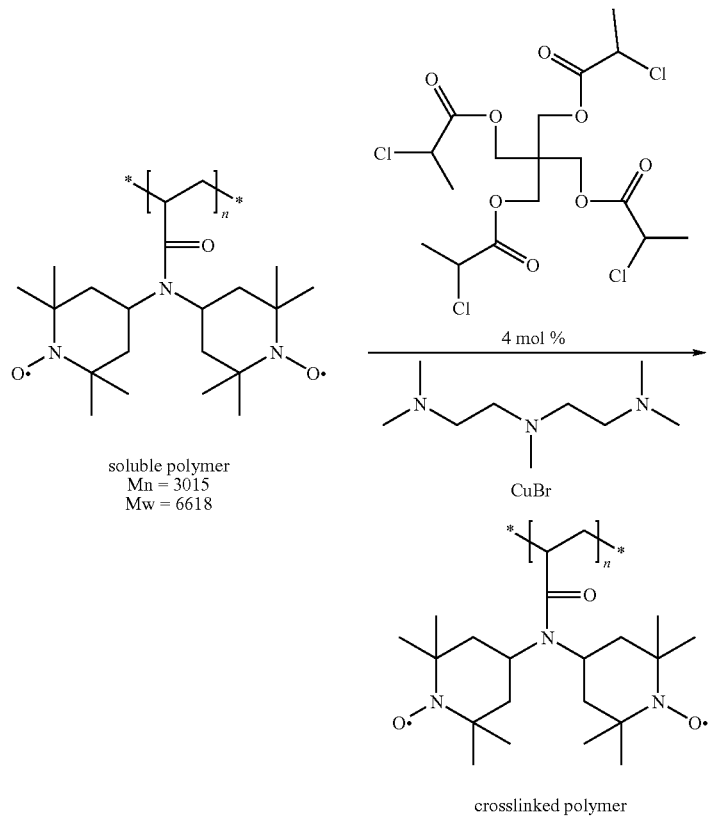

N,N-Bis-(2,2,6,6-tetramethyl-piperidin-4-yl)-acrylamide

A 2500 ml flask equipped with stirrer, termometer and dropping funnel is charged with 1000 ml of dichloromethane, 147.75 g (500 mmol) N,N-bis-(2,2,6,6-tetramethyl-piperidin-4-yl)-amine (prepared as described in EP 838 455 A1) and 1.6 g 4-dimethylaminopyridine. Then, 47.5 g (525 mmol) of acryloylchloride are added during 4 h while keeping the temperature at 0-2° C. After additional 90 minutes of stirring the solution of 21 g (521 mmol) NaOH in 100 ml water is slowly added. The organic layer is separated, dried over MgSO$_4$ and evaporated. The residue (174.55 g) is recrystallized 3× from acetonitrile to afford 33.78 g of the title compound as white crystals, mp 115-118° C.

Poly-(N,N-Bis-(2,2,6,6-tetramethyl-piperidin-4-yl)-acrylamide)

A 100 ml round flask equipped with a magnetic stirrer, termometer and reflux condenser is charged with 20 ml chlorobenzene, 17.48 g (50 mmol) N,N-bis-(2,2,6,6-tetramethyl-piperidin-4-yl)-acrylamide and 0.75 ml (3.75 mmol) di-t-butyl-peroxide. The mixture is deoxygenated by 3 vacuum-argon cycles and then stirred at 125° C. for 17 h. The thick reaction mass is evaporated in vacuo and the glassy residue (19.65 g) is dissolved in 50 ml THF. The solution is slowly under stirring added to 2500 ml hexane. The precipitate is filtered off and dried to afford 15.55 g of the title polymer as a white powder.

Poly-(N,N-Bis-(2,2,6,6-tetramethyl-piperidin-N-oxyl-4-yl)-acrylamide)

A 750 ml flask equipped with stirrer, termometer and dropping funnel is charged with 30 g NaHCO$_3$ (357 mmol) and 200 g of ice-water (1:1) mixture. To the stirred mixture is then slowly dropped 45.63 g (240 mmol) of peracetic acid (40% solution in acetic acid). To the resulting cold (−9° C.) mixture ias then during 30 minutes dropped the solution of 13.98 g (40 mmol) poly-(N,N-Bis-(2,2,6,6-tetramethyl-piperidin-4-yl)-acrylamide) in 150 ml dichloromethane while keeping the temperature at 0-2° C. Additional 28.8 g (343 mmol) NaHCO$_3$ are added carefully after 2 h of stirring. The red mixture is then allowed to warm to room temperature during 21 h of stirring. The red organic layer is separated, washed with 5% aqueous NaOH (200 ml), dried over Na$_2$SO$_4$ and evaporated. The red residue is dissolved in 50 ml dichloromethane and poured slowly and under stirring into 800 ml hexane. The red precipitate is filtered off, washed with hexane and dried to afford 12.56 g of orange powder, Mn=3015. Mw=6618).

Crosslinking

To a stirred solution of 11.39 g (30 mmol) of poly-(N,N-Bis-(2, 2, 6, 6-tetramethyl-piperidin-N-oxyl-4-yl)-acrylamide) (Mn=3015, Mw=6618), in 120 ml acetone are added under argon 0.60 g (1.2 mmol) 2-chloro-propionic acid 3-(2-chloro-propionyloxy)-2,2-bis-(2-chloropropionyloxymethyl)-propyl ester (prepared by reaction of pentaerythritol with 2-chloropropionyl chloride), 2.58 g (18 mmol) CuBr, and 3.12 g (18 mmol) N,N,N',N',N'-pentamethyldiethylentriamine. The mixture is stirred at room temperature for 22 h. The originally fluid mixture transforms into a thick, deep green, gummy mass. Water (200 ml) is then added and the mixture is vigorously stirred for 3 h. The precipitate is filtered off and washed with water. The brown residue is slurried in 200 ml water containing 1 g EDTA-Disodium salt, stirred for 3 h, filtered off, washed thoroughly with water and dried. The red powder residue (12.37 g) is 4× slurried up in 150 g acetone and centrifuged. Drying of the acetone insoluble material afforded 9.57 g of orange powder. This material is completely insoluble in tetrahydrofurane, dichloromethane, toluene and acetone.

The invention claimed is:

1. A process for the preparation of a crosslinked polymer with pendant nitroxide groups, comprising
reacting a bis nitroxide of formula (A)•ON—Ln—NO•(A) or a polynitroxide of formula (B) Ln—[NO•]$_n$(B) with a bis-functional or polyfunctional organic halogen containing compound in the presence of a transition metal or transition metal salt in its lower oxidation state and a ligand capable of complexing the transition metal or transition metal salt; wherein
Ln is a n valent spacer group or a repeating unit connecting the nitroxide groups;
n is a number from 3 to 50,000 wherein
the molar ratio of the bis or polynitroxide compound of formula (A) or B to the bis-functional or polyfunctional halogen compound is equal or greater than 5:1.

2. A process according to claim 1 wherein the ligand is of formula I

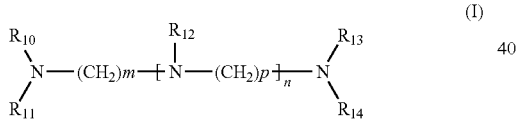

wherein $R_{10}$, $R_{11}$, $R_{13}$ and $R_{14}$ are independently H, $C_1$-$C_{12}$alkyl, $C_5$-$C_{12}$cycloalkyl or aryl;
$R_{12}$ is H, $C_1$-$C_{12}$alkyl, $C_5$-$C_{12}$cycloalkyl or aryl or a group —(CH$_2$)q—NR$_{10}$R$_{11}$;
m, p and q are numbers from 1-4;
n is a number from 0 to 4; or
the ligand is a bicyclic or polycyclic heteroaliphatic ring.

3. A process according to claim 1 wherein the ligand is tris[2-(dimethylamino)ethyl]amine, N,N,N',N',N'-pentamethyldiethylenetriamine, N,N,N',N'-tetramethylethylenediamine, 1,1,4,7,10,10-hexamethyltriethylenetetramine, 1,4,7-trimethyl-1,4,7-triazacyclononane, 1,5,9-trimethyl-1,5,9-triazacyclododecane, 1,4,8,11-etramethyl-1,4,8,11-tetraazacyclotetradecane, 2,2'-bipyridine, 2,2'-bi(4-t-butyl)pyridine or 2,2', 2'-terpyridine.

4. A process according to claim 1 wherein the molar ratio between the transition metal or transition metal salt in its lower oxidation state and the halogen containing compound is from 1:1 to 3:1.

5. A process according to claim 1 wherein the transition metal is Cu, Fe, Mn, Mo, Cr, Ni or Ru and the transition metal salt in its lower oxidation state is a halogenide, sulfate, nitrate, carboxylate or trifluoromethane sulfonate of these metals.

6. A process according to claim 1 wherein the molar ratio between the transition metal or transition metal salt in its lower oxidation state and the ligand is from 2:1 to 1:5.

7. A process according to claim 1, which is carried out at a temperature from −20° C. 100° C.

8. A process according to claim 1 wherein the bis-functional or polyfunctional halogen compound is of formula (IIa) or (IIb)

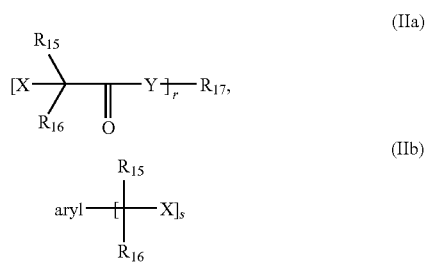

wherein
wherein $R_{15}$, and $R_{16}$ are H, $C_1$-$C_{12}$alkyl, $C_6$-$C_{10}$aryl, $C_5$-$C_{12}$cycloalkyl; aryl is phenyl, naphthyl or biphenyl;
Y is O or NR$_{15}$;
$R_{17}$ is a 2-10 valent organic or inorganic residue
r is a number from 2 to 10
s is a number from 2 to 6 and
X is Cl or Br.

9. A process according to claim 1 wherein the nitroxide group attached to the spacer group or repeating unit is of formulae

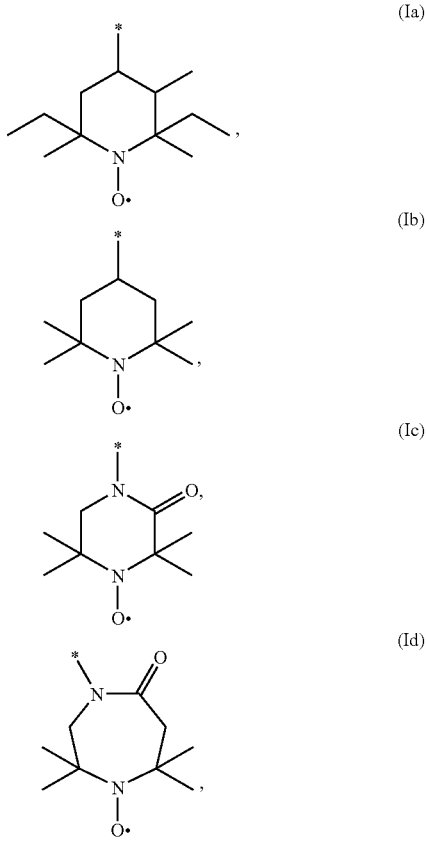

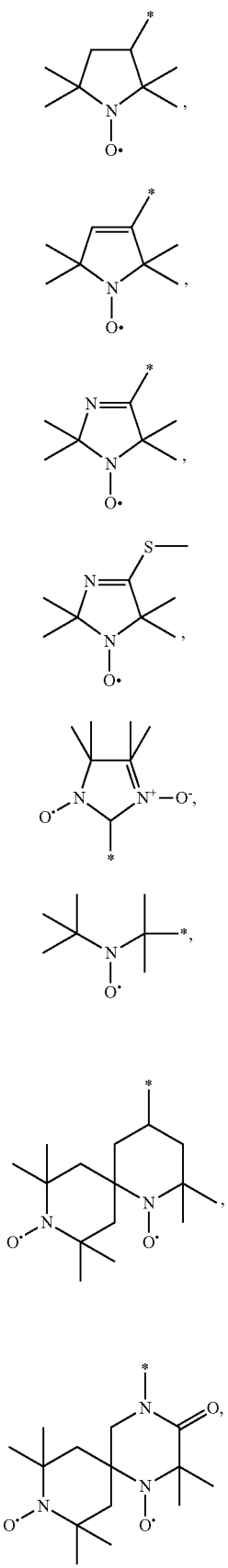

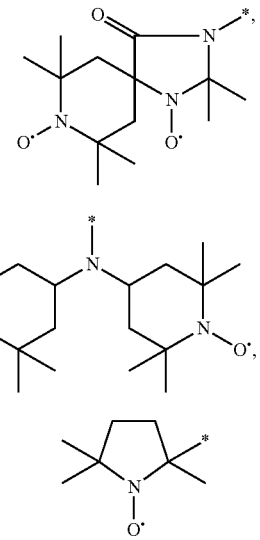

wherein * denotes the point of attachment.

10. A process according to claim 9 wherein the nitroxide group attached to the spacer group or repeating unit is of formulae

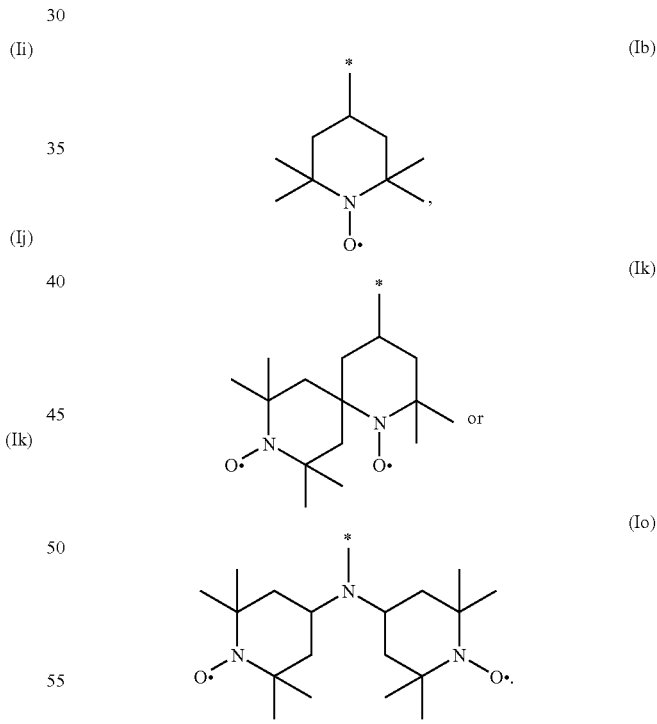

11. A process according to claim 1 wherein the spacer group or repeating unit is the residue of a divalent, trivalent or tetravalent acyl group derived from the corresponding carboxylic acid, the residue of a divalent, trivalent or tetravalent alcohol derived from the corresponding alcohol or the residue of a divalent, trivalent or tetravalent amine derived from the corresponding amine or the repeating unit may also be the residue of an ethylenically unsaturated carboxylic acid or carboxylic acid derivative.

12. A process according to claim 9 wherein the polynitroxide of formula (B) has a repeating unit and is of formula (III)

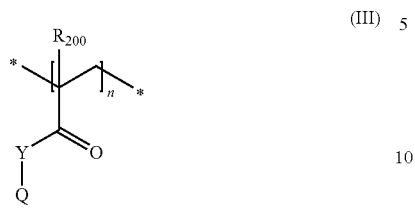

(III)

wherein
$R_{200}$ is H or $C_1$-$C_4$alkyl
Y is O or $NR_{201}$ wherein $R_{201}$ is H or $C_1$-$C_{18}$alkyl;
Q is a nitroxide radical of formulae (Ia) to (Ip) and n is a number from 10 to 50,000.

13. A crosslinked polymer obtained according to the process of claim 1.

14. A polymer comprising a stabilizer against the detrimental influences of heat and UV light or against premature polymerization of vinyl aromatic monomers, said stabilizer being a crosslinked polymer according to claim 13.

15. An active electrode material in a secondary battery, comprising a crosslinked polymer according to claim 13.

* * * * *

UNITED STATES PATENT AND TRADEMARK OFFICE
CERTIFICATE OF CORRECTION

PATENT NO. : 8,492,511 B2
APPLICATION NO. : 12/296330
DATED : July 23, 2013
INVENTOR(S) : Nesvadba et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1325 days.

Signed and Sealed this
Eighth Day of September, 2015

Michelle K. Lee
*Director of the United States Patent and Trademark Office*